United States Patent [19]

Kuo et al.

[11] Patent Number: 5,502,144
[45] Date of Patent: Mar. 26, 1996

[54] COMPOSITION AND METHOD FOR PREPARING SILICONE ELASTOMERS

[75] Inventors: Chung-Mien Kuo, Midland, Mich.; Stephen J. Clarson, Loveland, Ohio

[73] Assignees: University of Cincinnati, Cincinnati, Ohio; Three Bond Co., Ltd., Tokyo, Japan

[21] Appl. No.: 275,977

[22] Filed: Jul. 15, 1994

[51] Int. Cl.$^6$ .................................................. C08G 77/08
[52] U.S. Cl. ................................................. 528/18; 528/21
[58] Field of Search ........................................ 528/18, 21

[56] References Cited

U.S. PATENT DOCUMENTS

| | | | |
|---|---|---|---|
| 3,035,016 | 5/1962 | Bruner | 260/46.5 |
| 3,133,891 | 5/1964 | Ceyzeriat | 260/18 |
| 3,169,942 | 2/1965 | Pike | 260/46.5 |
| 3,189,576 | 6/1965 | Sweet | 260/46.5 |
| 3,382,205 | 5/1968 | Beers | 260/37 |
| 3,819,563 | 6/1974 | Takago et al. | 260/37 SB |
| 3,962,160 | 6/1976 | Beers et al. | 260/18 S |
| 3,996,184 | 12/1976 | Klosowski | 528/21 |
| 3,997,496 | 12/1976 | Razzano | 260/46.5 R |
| 4,323,489 | 4/1982 | Beers | 524/788 |
| 4,377,706 | 3/1983 | Hallgren | 556/482 |
| 4,395,526 | 7/1983 | White et al. | 528/18 |
| 4,826,915 | 5/1989 | Stein et al. | 524/731 |
| 4,851,475 | 7/1989 | Federici et al. | 525/104 |
| 4,863,992 | 9/1989 | Wengrovius et al. | 524/731 |
| 5,004,793 | 4/1991 | Nagaoka et al. | 528/15 |
| 5,036,114 | 7/1991 | Lutz et al. | 522/20 |
| 5,039,735 | 8/1991 | Arai et al. | 528/18 |
| 5,166,296 | 11/1992 | Wengrovius et al. | 528/18 |
| 5,206,328 | 4/1993 | Okamura et al. | 528/14 |
| 5,246,979 | 9/1993 | Lutz et al. | 522/42 |

FOREIGN PATENT DOCUMENTS

| | | |
|---|---|---|
| 943841 | 12/1963 | United Kingdom . |
| 1039445 | 8/1966 | United Kingdom . |

OTHER PUBLICATIONS

He, X. W., et al, Eur. Polym. J. 24(12): 1145(1988).
Severnyi, V. V., et al, Vysokomol, Soedin, A18: No. 6, 1276 (1976).
Kuo, C. M., Experimental Studies of Siloxane Polymers and their Elastomeric Networks—Doctoral Dissertation—University of Cincinnati, title page, abstract, pp. 45–70, 90–91–94–96, 99–129, 131, 139.

*Primary Examiner*—Melvyn I. Marquis
*Attorney, Agent, or Firm*—Frost & Jacobs

[57] ABSTRACT

Compositions and a method for performing the room temperature vulcanization of silicone elastomers are disclosed. The compositions and method utilize specifically-defined hydroxy-terminated polyorganosiloxanes, cross-linking agents which contain a hydrolyzable moiety, a catalyst which exhibits catalytic action in the condensation reaction between the hydroxy groups of the polyorganosiloxanes and the hydrolyzable groups of the cross-linking agents, and a formamide-type cure accelerator component. It has been found that these compositions can be stably stored under substantially moisture-free conditions and be readily vulcanized to form solid elastomers when exposed to moisture in the air. The vulcanization process provides a fast cure and a final silicone rubber product which exhibits good depth of hardening and excellent physical properties.

22 Claims, No Drawings

COMPOSITION AND METHOD FOR PREPARING SILICONE ELASTOMERS

TECHNICAL FIELD

The present invention relates to compositions which are used to prepare silicone elastomers through a room temperature vulcanization (RTV) process. The method of carrying out that room temperature vulcanization process is also taught.

BACKGROUND OF THE INVENTION

Considerable attention has been directed in recent years to the development of improved single package room temperature vulcanizable (sometimes referred to as "RTV") compositions. Under ideal conditions, these compositions would be stable for an indefinite period when stored in the absence of moisture, and would rapidly cure to a tack-free elastomer upon contact with moisture, including the relatively small proportions of water vapor present in the atmosphere.

Room temperature vulcanizable silicone elastomer compositions curable through a variety of different mechanisms are known in the art. In a typical RTV composition, a major constituent is a silane-based material, such as a polydiorganosiloxane containing polyalkoxysilyl (typically dialkoxyalkylsilyl) end groups. These groups may be formed in situ by incorporating in the RTV composition a silanol-terminated silicone and, as an end capping reagent, a polyalkoxysilyl compound such as methyltrimethoxysilane or dimethyltetramethoxydisilazane, which undergo a reaction to produce the polyalkoxysilyl-terminated species. It is generally more efficient, however, to utilize pre-formed polyalkoxysilyl-terminated materials prepared by the same reaction in the RTV compositions.

In either case, the silane-based material, e.g., the polyalkoxysilyl-terminated species, is capable of being cross-linked by atmospheric moisture in the presence of a suitable metal-containing catalyst, usually an ammonium, titanium or a tin compound. Disclosures of RTV compositions of this type are present in many patents and publications.

Of special interest regarding the present invention are RTV compositions which are curable upon exposure to moisture based on a mechanism utilizing hydrolyzable functional groups contained on the siloxane materials (i.e., a polycondensation reaction). These compositions are generally prepared by combining an organosilandiol, usually a diorganosilanol, with a suitable cross-linking agent, optionally in the presence of standard components such as fillers, plasticizers, sag control agents and the like. An example of such a composition is disclosed in U.S. Pat. No. 4,395,526.

RTV silicone elastomer technology is extremely useful and commercially successful, but slow room temperature curing speeds limit its wider application. Typically, this technology can achieve a depth of cure from top to bottom of only about two millimeters in a twenty-four hour period and three millimeters after a seventy-two hour period. Therefore, means to improve the slow curing speed of RTV silicone elastomers have been actively sought.

One approach to this problem uses methyltriacetoxysilane with a dihydroxy-terminated polydimethylsiloxane under substantially anhydrous conditions. See, for example, U.S. Pat. No. 3,133,891, Ceyzeriat; U.S. Pat. No. 3,035,016, Bruner; and U.S. Pat. No. 3,382,205, Beers. While this approach provides a fast cure and good adhesion, the acetoxysilane cross-linker materials release a strong acid odor and are corrosive to metal substrates.

Alkoxysilane cross-linking agents provide an alternative approach which does not corrode the metal substrates or produce strong unpleasant odors in use (see U.S. Pat. Nos. 4,377,706 and 4,395,042). However, these materials exhibit a relatively slow curing speed.

U.S. Pat. Nos. 3,189,576, 4,323,489, and 3,962,160 generally relate to ketoxime cross-linking agents used in room temperature vulcanizable polysilanol compositions. These ketoxime cross-linkers, however, are also slower than the acetoxy-type materials.

Another solution is proposed in U.S. Pat. No. 3,819,563, where an alkenyloxysilane cross-linker is compounded with a silanol-terminated polydimethylsiloxane under substantially anhydrous conditions prior to cure. Upon exposure to the atmosphere, these alkenyloxy cross-linkers provide fast cure speed, no odor and essentially no metal corrosion. Their major drawback is that they are very expensive and not compatible with conventional inorganic fillers which are necessary to achieve good physical properties in the final elastomer product.

It has now been found that when certain formamide-type compounds are used in a catalyzed RTV polycondensation reaction to form silicone elastomeric materials, excellent and improved results are obtained. Specifically, this RTV reaction provides a fast cure together with a good depth of hardening in the final product. The compositions provided for in the present invention can be stably stored under substantially moisture-free conditions and are readily vulcanized to form solid elastomers when exposed to moisture in the atmosphere.

U.S. Pat. No. 4,863,992, Wengrovius et al, issued Sep. 5, 1989, describes the preparation of polyalkoxysilyl-terminated silicones using specific end-capping catalysts which are converted in the reaction mixture to "harmless end products". The catalysts used are amine salts of formic acid (e.g., the salt of di-n-butylamine and formic acid). In the reaction mixture, this material is broken down into butylformamide which was chosen because it is inert in the reaction mixture. There is no suggestion in this patent to use formamide-type materials in an elastomer curing reaction.

U.S. Pat. No. 5,004,793, Nagaoka, et al, issued Apr. 2, 1991, describes an RTV composition using a novel specifically-defined siloxane-amide block copolymer together with a cross-linking agent and an organolin curing catalyst. N,N-dimethylformamide is taught to be useful as a solvent for making the block copolymer, but there is no suggestion to use it in the RTV reaction itself.

U.S. Pat. No. 5,206,328, Okamura, et al, issued Apr. 27, 1993, describes a method for producing organopolysilanes containing an epoxy group. An aprotic polar organic solvent may be used in this reaction; N,N-dimethylformamide is a preferred solvent. There is no suggestion to use this formamide-type material in an RTV reaction.

He, X. W., et al, *Eur. Polym. J.*, 24 (12), 1145 (1988), describes the polycondensation reaction between alpha, omega-dihydroxy polydimethylsiloxane and tri- or tetra-alkoxysiloxane, catalyzed by stannous octoate. There is no suggestion to use formamide-type compounds in this system.

SUMMARY OF THE INVENTION

The present invention relates to compositions used in the room temperature vulcanization of silicone elastomers.

Those compositions comprise:

(a) a hydroxy-terminated polyorganosiloxane having the formula

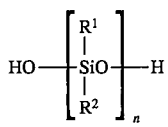

wherein $R^1$ and $R^2$ are each $C_1$–$C_{13}$ monovalent, substituted or unsubstituted hydrocarbon groups, and n is an integer from about 1 to about 10,000;

(b) a cross-linking agent having the formula

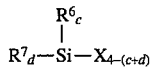

wherein $R^6$ and $R^7$ are each substituted or unsubstituted monovalent radicals selected from hydrogen, $C_1$–$C_{13}$ alkyl, alkenyl, alkoxy, haloalkyl, cyanoalkyl, aryl, aryloxy, and mixtures thereof; c and d are each 0 or 1, and X is a hydrolyzable radical; the amount of said cross-linking agent being from about 0.1 to about 30 parts by weight based on 100 parts by weight of component (a);

(c) an effective amount of a condensation curing catalyst which exhibits a catalytic action in the condensation reaction of the hydroxy groups in component (a) with the hydrolyzable groups in component (b); the amount of component (c) being from about 0.001 to about 10 parts by weight based on 100 parts by weight of component (a); and (d) an effective amount of a cure accelerator having the formula

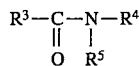

wherein $R^3$, $R^4$ and $R^5$ are each selected from hydrogen and $C_1$–$C_{10}$ substituted or unsubstituted hydrocarbons, the amount of said cure accelerator being from about 0.1 to about 10 parts by weight based on 100 parts by weight of component (a).

The method of preparing silicone elastomers at room temperature in the presence of moisture using the components described above is also taught.

In the present application, all percentages, proportions and ratios given are "by weight" unless otherwise specified.

DETAILED DESCRIPTION OF THE INVENTION

The required and optional components used in practicing the compositions and methods of the present invention are described in detail below.

The present invention utilizes a polyorganosiloxane compound terminated with hydroxy groups. These materials have the following formula:

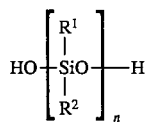

(1)

In this formula, $R^1$ and $R^2$ may be the same or different moieties. In these compounds, the R groups may be $C_1$–$C_{13}$, preferably $C_1$–$C_8$, monovalent substituted (e.g., halo-substituted) or unsubstituted hydrocarbon groups, such as alkyl, haloalkyl, alkoxy, alkenyl, aryl, aryloxy, cyanoalkyl, and mixtures thereof. Examples of such moieties include methyl, phenyl, cyanoethyl, 1,1,1-trifluoropropyl, trifluoromethyl, and vinyl groups. Particularly preferred R groups include methyl, phenyl, 1,1,1-trifluoropropyl, and mixtures thereof.

In this component, it is preferred that the majority of the R groups contained in the compound (i.e., at least about 50%) are methyl groups, with only a minor proportion of the R groups being other than methyl. Thus, in these preferred compounds, the R groups are all methyl or a mixture of mostly methyl with the other enumerated groups.

In the above formula, n is an integer having a value of from about 1 to about 10,000, preferably of from about 50 to about 2,500. A preferred polyorganosiloxane for use in the present invention is alpha, omega-dihydroxy polydimethylsiloxane having a value of n of from about 50 to about 2500. It should be noted that the polyorganosiloxane is not only intended to include polyorganosiloxanes themselves, but also block copolymers which incorporate polyorganosiloxane segments within them, as long as those polyorganosiloxane segments meet the requirements set forth herein.

The second component used in the compositions of the present invention is a network-forming or cross-linking agent having the formula given below. This material, through a hydrolysis reaction, reacts with the hydroxyl groups in the polyorganosiloxane component to form crosslinks between them.

(2)

In this formula, $R^6$ and $R^7$ constituents (which in general can be the same as $R^1$ and $R^2$, defined previously) can be the same or different substituted (e.g., halo-substituted) or unsubstituted monovalent groups selected from hydrogen, $C_1$–$C_{13}$, preferably $C_1$–$C_8$, alkyl, alkenyl, alkoxy, haloalkyl, cyanoalkyl, aryl or aryloxy, or mixtures of those groups. In the formula, c or d can either be 0 or 1 and the number of X groups in the formula will be determined by the value of c and d in the formula. X is a hydrolyzable group attached to the silicon atom. Preferably, these hydrolyzable groups, X, contain from about 1 to about 12 carbon atoms. For example, X may be an alkoxy group, such as methoxy, ethoxy, or propoxy; an alkenyloxy group, such as isopropenoxy or 1-ethyl-2-methyl vinyl oxime; a ketoxime group, such as dimethyl ketoxime or methyl ethyl ketoxime; an acyloxy group, such as acetoxy, propionoxy, butyroxy or benzoyloxy; an amino group, such as dimethyl amino or diethyl amino; an aminoxy group, such as dimethyl aminoxy or diethyl aminoxy; or an amide group, such as N-methylacetoamide, N-ethylacetoamide or N-methylbenzamide.

Preferred cross-linking agents useful in the present invention include the following:

ethyl silicate, propyl silicate, methyltrimethoxysilane, methyltriethoxysilane, vinyltrimethoxysilane, vinyltriethoxysilane, methyltris(methoxyethoxy)silane, vinyltris(methylethyl)silane, methyltripropenoxy silane, methyltriacetoxy silane, vinyltriacetoxy silane, methyltri(butanoxime)silane, vinyltri(butanoxime)silane, vinylketoxime silane, phenyltri(butanoxime)silane, propyltri(butanoxime)silane, tetra(butanoxime)silane, 3,3,3-trifluoropropyl(butanoxime)silane, 3-chloropropyl(butanoxime)silane, methyltri(propanoxime)silane, methyltri(pentanoxime)silane, methyltri(isopentanoxime)silane, vinyl(cyclopentanoxime)silane, methytri- (cyclohexanoxime)silane, the partial hydrolysis products of the foregoing compounds, and mixtures thereof.

Particularly preferred cross-linking agents are vinylketoxime silane, methylketoxime silane, and mixtures thereof.

The cross-linker component may be used either singly or in mixtures in the present invention. The total cross-linker component should be included in the compositions of the present invention in an amount of from about 0.1 to about 30 parts, preferably from about 5 to about 20 parts (especially for a single pack moisture-activated product), by weight, based on 100 parts by weight of the hydroxy-terminated polyorganosiloxane component.

The third component required in the present invention is a curing catalyst which exhibits a catalytic action in the condensation reaction involving the hydroxy groups of component (a) and the hydrolyzable groups found in component (b). Conventionally known curing catalysts may be used in the present invention in this capacity. Examples of these curing catalysts include metal salts of carboxylic acids, such as iron octoate, cobalt octoate, manganese octoate, zinc octoate, tin naphthenate, tin caprylate and tin oleate; and organotin compounds, such as dibutyltin diacetate, dibutyltin dioctoate, dibutyltin dilaurate, dibutyltin dioleate, diphenyltin diacetate, dibutyltin oxide, dibutyltin dimethoxide, dibutylbis(triethoxysiloxy)tin, and dioctyltin dilaurate. Of those, organotin compounds are preferred because they have high catalyic activity and are effective even when present in relatively small amounts. Preferred catalyst compounds include organic tin (II) compounds, such as stannous octoate, stannous oleate, stannous caprylate, and stannous laurate; and organic tin (IV) compounds, such as dibutyltin dilaurate, dibutyltin dioctoate, and dibutyltin dimethoxide. Particularly preferred catalysts are dibutyltin dilaurate, dibutyltin dioctoate, tin (II) dioctoate, and mixtures thereof.

The curing catalyst described above may be used either singly or in mixtures in the present invention. The total amount of catalyst component included in the compositions of the present invention are from about 0.001 to about 10 parts, preferably from about 0.004 parts to about 3 parts, by weight, based upon 100 parts by weight of component (a). If the amount of a catalyst component is smaller than about 0.001 parts by weight an overly long time will be required for the formation of a tack-free film when the composition is exposed to air. An amount of catalyst exceeding about 10 parts by weight could result in an extremely short film forming time which would be difficult to control effectively.

The final component required in the present invention is a cure accelerator having the following formula.

  (3)

In this formula, $R^3$, $R^4$ and $R^5$ are selected from hydrogen and $C_1$–$C_{10}$ substituted or unsubstituted hydrocarbons, preferably hydrogen and $C_1$–$C_3$ hydrocarbons (preferably alkyl), most preferably hydrogen and methyl. The definition of the cure accelerator component used herein is intended to include compounds in which the $R^3$, $R^4$ or $R^5$ groups are 3–6 member rings or in which any two of these groups together form a 3–6 member ring (e.g., butyrolactam). Examples of cure accelerators useful in the present invention include formamide, N-methylformamide, N,N-dimethylformamide, and mixtures thereof. Formamide is the most preferred cure accelerator for use herein.

The cure accelerator component may be used either singly or in combination in the present invention, provided that the entire component is used at levels of from about 0.1 to about 10 parts, preferably from about 1 part to about 7 parts, by weight, based upon 100 parts by weight for component (a). Clearly, the precise levels of the components utilized in the present invention will depend upon the specific details and desired properties of the particular composition being formulated (e.g., the identity and the usage levels of each of the polyorganosiloxane, cross-linking agent, curing catalyst and cure accelerator used, as well as the desired cure time and properties of the finished silicone rubber).

In addition to the required components, described above, various filler materials can be used at their conventional use levels to give the final elastomer products the physical or chemical properties desired. Such fillers include metallic oxides, such as pulverized silica, silica aerogels, fumed silica, precipitated silica, aluminum oxide, ferric oxide, zinc dioxide, and titanium oxide; metallic carbonates, such as calcium carbonate, magnesium carbonate and zinc carbonate; glass wool, carbon black, mica, polyethylene, polyvinyl chloride powder, polypropylene, boron nitride, and mixtures thereof. Other components which may be included at their art-established use levels include pigments, dyes, flame-retarding agents, plasticizers, moisture scavengers, thixotropic agents, adhesion promoters, surface treatment agents, solvents, ultraviolet inhibitors, electrically conductive fillers, and mixtures thereof. Carbon functional silanes containing amino, epoxy or mercapto groups may also be included as adhesion promoters or surface treatment agents.

The compositions of the present invention are prepared by mixing together the required ingredients, as well as the fillers and other additives, described above, uniformly in a substantially moisture-free environment (e.g., in dried air or a nitrogen atmosphere). As used herein "substantially moisture-free" means a sufficiently anhydrous atmosphere such that when all of the components of the present invention are mixed together no pre-gellation takes place. The composition thus attained is a single pack room temperature curing composition which is preserved stably in a closed container and is cured by exposing the composition to the moisture contained in the atmosphere.

Alternatively, the method aspect of the present invention may be practiced by mixing all four required components (plus any optional components desired) together individually or by packaging two or three of the required components together in a multi-pack type arrangement (e.g., separating the polysiloxane component from the cross-linker component or separating the silicone components from the catalyst and accelerator components). These multi-pack compositions are then cured by mixing all components together under normal atmospheric conditions, generally at room temperature. Since the curing of these compositions is not triggered by moisture in the atmosphere, they do not have to be prepared or stored in a substantially moisture-free environment.

Before curing, the room temperature curable organosiloxane compositions of the present invention exhibit good processibility. When the required components are mixed in a moisture-containing atmosphere, they become vulcanized quickly producing a silicone rubber material having excellent mechanical properties.

The following non-limiting examples illustrate the compositions and methods which comprise the present invention. They are intended to be illustrative only and not limiting of the scope of the inventions herein.

EXAMPLE ONE

A room temperature vulcanizable (RTV) organopolysilicone composition (Composition 1) is prepared by blending together, under substantially moisture-free conditions, 100 parts of an alpha, omega-dihydroxy polydimethylsiloxane (PPG Masil 6000), with a viscosity of 6,200 cSt, 0.05 parts dibutyltin (IV) diluarate (Aldrich), 160 parts calcium carbonate (Pfizer Vicron-15), 22 parts vinylketoxime silane (Allied Signal OS-2200) as moisture scavenger and cross-linking agent, and 14.8 parts di-trimethylsilyl-terminated polydimethylsiloxane, with a viscosity of 100 cSt (Huels PSO41), as a viscosity control agent. The blended composition is stored in an airtight cartridge ensuring the absence of atmospheric moisture until time of cure.

A second RTV composition is prepared in a similar fashion to that of Composition 1 except that it additionally includes 3 parts of dimethylformamide (Aldrich). (Composition 2)

A third RTV composition is prepared in a similar fashion to that of Composition 1 except that it additionally includes 3 parts of methylformamide (Aldrich). (Composition 3)

A fourth RTV composition is prepared in a similar fashion to that of Composition 1 except that it additionally includes 3 parts of formamide (Aldrich). (Composition 4)

The rate of room temperature moisture vulcanization is determined by measuring the depth of a cured plug of composition exposed to a controlled moisture and temperature environment through the open end of an upright Teflon cylinder at the end of a 24 hour period. Cylinders that are approximately 2.5 cm in height and 1 cm in inner diameter are respectively filled with each of the Compositions 1 through 4. When filled, the cylinders are placed upright in a 50%±2% relative humidity and 25 deg. C.±1 deg. C. temperature cure chamber and removed after a 24 hour period. The material in the top of the cylinder will form a cured "plug" of polymer. This cured plug of material is removed from the uncured material, rinsed with toluene, dried and its thickness measured with calipers.

Results

| | Thickness of Cured Material (after 24 hours) |
|---|---|
| Composition 1 (Control) | 0.85 mm |
| Composition 2 | 1.50 mm |
| Composition 3 | 1.65 mm |
| Composition 4 | 1.75 mm |

EXAMPLE TWO

A room temperature vulcanizable (RTV) organopolysilicone composition is prepared by blending together, under substantially moisture-free conditions, 100 parts of an alpha, omega- dihydroxy polydimethylsiloxane (PPG Masil 6000), with a viscosity of 6,200 cSt, 0.004 parts dibutyltin (IV) dioctoate (Aldrich), 160 parts calcium carbonate (Pfizer Vicron-15), 22 parts vinylketoxime silane (Allied Signal OS-2200) as moisture scavenger and cross-linking agent, and 14.8 parts di-trimethylsilyl-terminated polydimethylsiloxane, with a viscosity of 100 cSt (Huels PSO41), as a viscosity control agent (Composition 5). The blended composition is stored in an airtight cartridge ensuring the absence of atmospheric moisture until time of cure.

A second RTV composition is prepared in a similar fashion to that of Composition 5 except that it additionally includes 1 part of formamide (Aldrich). (Composition 6)

A third RTV composition is prepared in a similar fashion to that of Composition 5 except that it additionally includes 3 parts of formamide (Aldrich). (Composition 7)

A fourth RTV composition is prepared in a similar fashion to that of Composition 5 except that it additionally includes 5 parts of formamide (Aldrich). (Composition 8)

The rate of room temperature moisture vulcanization is determined in the same manner as in Example One with the exception that depth of cure measurements are made after 20 hours.

Results

| | Thickness of Cured Material* (after 20 hours) |
|---|---|
| Composition 5 (Control) | 1.73 mm +/− 0.05 mm |
| Composition 6 | 1.83 mm +/− 0.04 mm |
| Composition 7 | 2.76 mm +/− 0.04 mm |
| Composition 8 | 3.39 mm +/− 0.08 mm |

*+/− one sigma standard deviation.

The rate of room temperature moisture vulcanization is also characterized by gel permeatation chromatography (GPC). Relative molar mass build per unit time is indicative of the rate of polymerization for similar chemical systems.

Teflon cylinders that are approximately 2.5 cm in height and 1 cm in inner diameter are respectively filled with Compositions 5 through 8. When filled, the cylinders are placed upright in a 50%±2% relative humidity and 25 deg. C.±1 degree C. temperature cure chamber and removed after thirty minutes. Approximately 0.5 grams of material, from the topside of the cylinder that is exposed to moisture, is removed and dissolved in 20 grams of toluene. The dissolved partially reacted polymer is separated from the inorganic filler by ultracentrifugation. Twenty microliters of supernatant solution is analyzed by GPC under the following conditions and relative numerical values for molecular weight are determined by comparison to polystyrene standards:

2 Water's HR-5E (7.8 mm×300 mm) columns 1.0 mL/min. flow rate and system pressure of 266 psi.

Toluene carrier solvent

Differential Refractive Index Detector

Internal Standard—cyclic dimothylsiloxane tetramer (D4 Source: Huels America)

| | Polystyrene Standards: | | |
|---|---|---|---|
| | Molecular Wgt. (g/mole) | Polydispersity ($M_w/M_n$) | Source |
| 1 | 3,250 | 1.02 | Polymer Laboratories, LTD. |
| 2 | 9,200 | 1.01 | Polymer Laboratories, LTD. |
| 3 | 28,500 | 1.03 | Polymer Laboratories, LTD. |
| 4 | 66,000 | 1.03 | Polymer Laboratories, LTD. |
| 5 | 156,000 | 1.03 | Polymer Laboratories, LTD. |
| 6 | 570,000 | 1.05 | Polymer Laboratories, LTD. |

Results

| Composition | Molecular Wgt. (g/mole) |
|---|---|
| 5 (Control) | 55,320 |
| 6 | 56,098 |
| 7 | 56,643 |
| 8 | 59,385 |

Composition 8 had the fastest rate of molar mass build followed by Compositions 7, 6, and 5. The increased rate of cure followed the increased concentration of cure promoting additive in the RTV composition.

EXAMPLE THREE

A room temperature vulcanizable (RTV) organopolysilicone composition is prepared by blending together, under substantially moisture-free conditions, 100 parts of an alpha, omega-dihydroxy polydimethylsiloxane (PPG Masil 6000) with a viscosity of 6,200 cSt, 0.0054 parts dibutyltin (IV) dioctoate (Aldrich), 0.0033 parts tin (II) dioctoate (Aldrich), 160 parts calcium carbonate (Pfizer Vicron-15), 22 parts vinylketoxime silane (Allied Signal OS-2200) as moisture scavenger and cross-linking agent, and 14.8 parts di-trimethylsilyl-terminated polydimethylsiloxane, with a viscosity of 100 cSt (Huels PSO41), as viscosity control agent (Composition 9). The blended composition is stored in an airtight cartridge ensuring the absence of atmospheric moisture until time of cure.

A second RTV composition is prepared in a similar fashion to that of Composition 9 except that it additionally includes 3 parts of formamide (Aldrich). (Composition 10)

A third RTV composition, used as a control, is prepared by blending together, under substantially moisture-free conditions, 100 parts of an alpha, omega-dihydroxy polydimethylsiloxane (PPG Masil 6000), with a viscosity of 6,200 cSt, 0.01 parts dibutyltin (IV) dioctoate (Aldrich), 160 parts calcium carbonate (Pfizer Vicron-15), 22 parts vinylketoxime silane (Allied Signal OS-2200) as moisture scavenger and cross-linking agent, and 14.8 parts di-trimethylsilyl-terminated polydimethylsiloxane, with a viscosity of 100 cSt (Huels PSO41), as a viscosity control agent. The blended composition is stored in an airtight cartridge ensuring the absence of atmospheric moisture until time of cure. (Composition 11)

The rate of room temperature moisture vulcanization is determined in the same manner as in Example One.

Results

| | Thickness of Cured Material* (after 24 hours) |
|---|---|
| Composition 9 (Control) | 1.98 mm +/− 0.09 mm |
| Composition 10 | 3.28 mm +/− 0.10 mm |
| Composition 11 (Control) | 1.95 mm +/− 0.08 mm |

*+/− one sigma standard deviation.

EXAMPLE FOUR

To demonstrate the good physical properties of cure promoted room temperature vulcanizable (RTV) organopolysilicone compositions of the present invention, three compositions with three different levels of cure promoter are examined. The first composition is the control (unpromoted) and is prepared by blending together, under substantially moisture-free conditions, 100 parts of an alpha, omega-dihydroxy polydimethylsiloxane (PPG Masil 6000), with a viscosity of 6,200 cSt, 0.050 parts dibutyltin (IV) dilaurate (Aldrich), 160 parts calcium carbonate (Pfizer Vicron-15), 22 parts vinylketoxime silane (Allied Signal OS-2200) as moisture scavenger and cross-linking agent, and 14.8 parts di-trimethylsilyl-terminated polydimethylsiloxane, with a viscosity of 100 cSt (Huels PSO41), as a viscosity control agent. (Composition 12). The blended composition is stored an airtight cartridge ensuring the absence of atmospheric moisture until time of cure.

A second RTV composition is prepared in a similar fasion to that of Composition 12 with the exception of the addition of 1 part of formamide (Aldrich). (Composition 13)

A third RTV composition is prepared in a similar fashion to that of Composition 12 with the exception of the addition of 3 parts of formamide (Aldrich). (Composition 14)

The hardness, elongation and tensile strength of these compositions are measured as follows. Tensile strength and elongation are measured according to ASTM D-40012 with specium size being Dumbbell Die Type C. The instrument used is a Shimatzu model AGS-1000B with a full force range for beam being 100 kg and a crosshead speed of 500 mm/min. Hardness is determined according to JIS K6301 Type A using an Asker model JA durometer.

| | Physical Properties** | | |
|---|---|---|---|
| | Hardness (Type A-JIS) | Elongation (%) | Tensile Strength (Kg/cm$^2$) |
| Composition 12 (Control) | 33.5 | 233 | 8.03 |
| Composition 13 | 35.5 | 207 | 8.52 |
| Composition 14 | 35.0 | 242 | 6.10 |

**Average of 3 runs.

What is claimed is:

1. A composition used in the polycondensation of silicone polymers to prepare silicone elastomers comprising:

(a) a hydroxy-terminated polyorganosiloxane having the formula

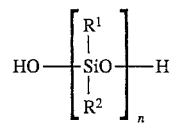

wherein $R^1$ and $R^2$ are each $C_1$–$C_{13}$ monovalent substituted or unsubstituted hydrocarbon groups, and n is an integer of from about 1 to about 10,000;

(b) a cross-linking agent having the formula:

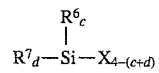

wherein $R^6$ and $R^7$ are each substituted or unsubstituted monovalent radicals selected from hydrogen, $C_1$–$C_{13}$ alkyl, alkenyl, alkoxy, haloalkyl, cyanoalkyl, aryl, aryloxy, or mixtures thereof, c and d are each 0 or 1, and X is a hydrolyzable radical; the amount of said cross-linking agent being from about 0.1 to about 30 parts by weight based on 100 parts by weight of component (a);

(c) an effective amount of a condensation curing catalyst which exhibits a catalytic action in the condensation reaction of the hydroxy groups in component (a) with the hydrolyzable groups in component (b); the amount of component (c) being from about 0.001 to about 10 parts by weight based on 100 parts by weight of component (a); and (d) an effective amount of a cure accelerator selected from the group consisting of formamide, N-methylformamide, and mixtures thereof.

2. A composition according to claim 1 wherein, in the cross-linking agent, X contains from about 1 to about 12 carbon atoms and is selected from the group consisting of alkoxy groups, alkenyloxy groups, ketoxime groups, acyloxy groups, amino groups, aminoxy groups, amide groups, and mixtures thereof.

3. A composition according to claim 2 wherein the condensation curing catalyst is an organotin compound.

4. A composition according to claim 3 wherein the condensation curing catalyst is selected from the group consisting of stannous octoate, stannous oleate, stannous caprylate, stannous laurate, dibutyltin dilaurate, dibutyltin dioctoate, tin (II) dioctoate, dibutyltin dimethoxide, and mixtures thereof.

5. A composition according to claim 4 wherein the cross-linking agent is selected from the group consisting of ethyl silicate, propyl silicate, methyltrimethoxysilane, methyltriethoxysilane, vinyltrimethoxysilane, vinyltriethoxysilane, methyltris(methoxyethoxy)silane, vinyltris(methylethyl)silane, methyltripropenoxy silane, methyltriacetoxy silane, vinyltriacetoxy silane, methyltri(butanoxime)silane, vinyltri(butanoxime)silane, vinylketoxime silane, methylketoxime silane phenyltri(butanoxime)silane, propyltri(butanoxime)silane, tetra(butanoxime)silane, 3,3,3-trifluoropropyl(butanoxime)silane, 3-chloropropyl(butanoxime)silane, methyltri(propanoxime)silane, methyltri(pentanoxime)silane, methyltri(isopentanoxime)silane, vinyl(cyclopentanoxime)silane, methytri-(cyclohexanoxime)silane, the partial hydrolysis products of the foregoing compounds, and mixtures thereof.

6. A composition according to claim 5 wherein, in the hydroxy-terminated polyorganosiloxane component, the majority of the R groups are methyl.

7. A composition according to claim 5 wherein, in the hydroxy-terminated polyorganosiloxane component, $R^1$ and $R^2$ are each selected from the group consisting of alkyl, haloalkyl, alkoxy, alkenyl, aryl, aryloxy, cyanoalkyl, and mixtures thereof.

8. A composition according to claim 7 wherein, in the hydroxy-terminated polyorganosiloxane component, $R^1$ and $R^2$ are each selected from the group consisting of methyl, phenyl, 1,1,1-trifluoropropyl, and mixtures thereof, and n has a value of from about 50 to about 2,500.

9. A composition according to claim 1 wherein the cure accelerator component is formamide.

10. A composition according to claim 8 wherein the cure accelerator component is formamide.

11. A composition according to claim 10 wherein the cross-linking agent is selected from the group consisting of vinylketoxime silane, methyl ketoxime silane, and mixtures thereof.

12. A composition according to claim 11 wherein the condensation curing catalyst is selected from the group consisting of dibutyltin dilurate, dibutyltin dioctoate, tin (II) dioctoate, and mixtures thereof.

13. A composition according to claim 1 which is substantially moisture free.

14. A composition according to claim 1 in the form of a multi-pack composition wherein the individual components are packaged singly or in combination in two or more containers which, when combined, cause the composition to cure.

15. A method for preparing silicone elastomers comprising the combining of the following components:

(a) a hydroxy-terminated polyorganosiloxane having the formula

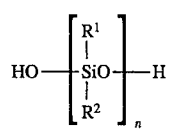

wherein $R^1$ and $R^2$ are each $C_1$–$C_{13}$ monovalent substituted or unsubstituted hydrocarbon groups, and n is an integer of from about 1 to about 10,000;

(b) a cross-linking agent having the formula:

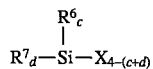

wherein $R^6$ and $R^7$ are each substituted or unsubstituted monovalent radicals selected from hydrogen, $C_1$–$C_{13}$ alkyl, alkenyl, alkoxy, haloalkyl, cyanoalkyl, aryl, aryloxy, or mixtures thereof, c and d are each 0 or 1, and X is a hydrolyzable radical; the amount of said cross-linking agent being from about 0.1 to about 30 parts by weight based on 100 parts by weight of component (a);

(c) an effective amount of a condensation curing catalyst which exhibits a catalytic action in the condensation reaction of the hydroxy groups in component (a) with the hydrolyzable groups in component (b); the amount of component (c) being from about 0.001 to about 10 parts by weight based on 100 parts by weight of component (a); and (d) an effective amount of a cure accelerator selected from the group consisting of formamide, N-methylformamide, and mixtures thereof; the amount of said cure accelerator being from about 0.1 to about 10 parts by weight based on 100 parts by weight of component (a).

16. The method according to claim 15 which is carried out at room temperature.

17. The method according to claim 15 which is carried out in the presence of moisture.

18. A method according to claim 17 wherein the condensation curing catalyst is selected from the group consisting of stannous octoate, stannous oleate, stannous caprylate, stannous laurate, dibutyltin dilaurate, dibutyltin dioctoate, tin (II) diocatoate dibutyltin dimethoxide, and mixtures thereof.

19. The method according to claim 18 wherein the cross-linking agent is selected from the group consisting of ethyl silicate, propyl silicate, methyltrimethoxysilane, methyltriethoxysilane, vinyltrimethoxysilane, vinyltriethoxysilane, methyltris(methoxyethoxy)silane, vinyltris(methylethyl)silane, methyltripropenoxy silane, methyltriacetoxy silane, vinyltriacetoxy silane, methyltri(butanoxime)silane, vinyltri(butanoxime)silane, vinylketoxime silane, methylketoxime silane, phenyltri(butanoxime)silane, propyltri(butanoxime)silane, tetra(butanoxime)silane, 3,3,3-trifluoropropyl(butanoxime)silane, 3-chloropropyl(butanoxime)silane, methyltri(propanoxime)silane, methyltri(pentanoxime)silane, methyltri(isopentanoxime)silane, vinyl(cyclopentanoxime)silane, methytri-(cyclohexanoxime)silane, the partial hydrolysis products of the foregoing compounds, and mixtures thereof.

20. The method according to claim 19 wherein the cure accelerator is formamide.

21. The method according to claim 19 wherein, in the hydroxy-terminated polyorganosiloxane component, $R^1$ and $R^2$ are each selected from the group consisting of alkyl, haloalkyl, alkoxy, alkenyl, aryl, aryloxy, cyanoalkyl, and mixtures thereof, and n has a value of from about 50 to about 2,500.

22. The method according to claim 21 wherein the crosslinking agent is selected from the group consisting of vinylketoxime silane, methylketoxime silane, and mixtures thereof; and the condensation curing catalyst is selected from the group consisting of dibutyltin dilaurate, dibutyltin dioctoate, tin (II) dioctoate, and mixtures thereof.

* * * * *